United States Patent
Schroll et al.

(12) 
(10) Patent No.: US 6,665,469 B1
(45) Date of Patent: Dec. 16, 2003

(54) LIGHT INJECTOR/EXTRACTOR FOR MULTIPLE OPTICAL FIBERS

(75) Inventors: Kenneth R. Schroll, Chatham, NJ (US); James P. Waters, Boonton Township, NJ (US); Janet Armstrong, Somerset, NJ (US)

(73) Assignee: General Dynamics Advanced Information Systems, Inc., McLeansville, NC (US)

( * ) Notice: Subject to any disclaimer, the term of this patent is extended or adjusted under 35 U.S.C. 154(b) by 0 days.

(21) Appl. No.: 10/038,396

(22) Filed: Jan. 2, 2002

(51) Int. Cl.$^7$ ................................................. G02B 6/26
(52) U.S. Cl. ........................................ 385/32; 385/31
(58) Field of Search ..................................... 385/32, 31

(56) References Cited

U.S. PATENT DOCUMENTS

| | | |
|---|---|---|
| 3,208,342 A | 9/1965 | Nethercot, Jr. ............... 88/61 |
| 4,134,640 A | 1/1979 | Auracher et al. ........ 350/96.15 |
| 4,164,364 A | 8/1979 | Witte ...................... 350/96.17 |
| 4,243,297 A | 1/1981 | Elion ...................... 350/96.15 |
| 4,402,568 A | 9/1983 | Kulich et al. ............ 350/96.16 |
| 4,511,207 A | 4/1985 | Newton et al. .......... 350/96.15 |
| 4,514,057 A | 4/1985 | Palmer et al. ........... 350/96.15 |
| 4,720,161 A | 1/1988 | Malavieille .............. 350/96.15 |
| 4,723,827 A | 2/1988 | Shaw et al. .............. 350/96.15 |
| 4,813,757 A | 3/1989 | Sakano et al. ........... 350/96.14 |
| 4,834,482 A * | 5/1989 | Campbell et al. .............. 385/32 |
| 4,859,022 A | 8/1989 | Opdahl et al. ............. 350/96.2 |
| 4,889,403 A | 12/1989 | Zucker et al. ........... 350/96.15 |
| 4,911,520 A | 3/1990 | Lee ........................... 350/96.2 |
| 4,938,552 A | 7/1990 | Jebens et al. .............. 350/96.2 |
| 4,946,236 A | 8/1990 | Dautartas et al. .......... 350/96.2 |
| 4,966,432 A | 10/1990 | Okada et al. ............ 350/96.15 |
| 4,991,922 A | 2/1991 | Dahlgren ................. 350/96.15 |
| 5,035,482 A | 7/1991 | ten Berge et al. ......... 350/96.2 |
| 5,098,459 A | 3/1992 | Fukuma et al. ............... 65/4.21 |
| 5,175,776 A | 12/1992 | Lee ............................... 385/16 |
| 5,235,657 A * | 8/1993 | Tardy ............................ 385/48 |
| 5,253,310 A | 10/1993 | Delbare et al. ................ 385/14 |
| 5,253,935 A * | 10/1993 | Uken et al. .................... 359/24 |
| 5,321,774 A | 6/1994 | Barnard et al. ................ 385/16 |
| 5,546,484 A | 8/1996 | Fling et al. .................... 385/16 |
| 5,796,888 A | 8/1998 | Furukawa et al. ............. 385/22 |
| 5,832,149 A | 11/1998 | Omizu et al. ................. 385/20 |
| 5,864,643 A | 1/1999 | Pan ............................... 385/33 |
| 5,920,665 A | 7/1999 | Presby ......................... 385/16 |
| 6,031,947 A | 2/2000 | Laor ............................ 385/22 |
| 6,044,186 A | 3/2000 | Chang et al. ................. 385/23 |
| 6,477,295 B1 * | 11/2002 | Lang et al. .................... 385/31 |

FOREIGN PATENT DOCUMENTS

| | | | | |
|---|---|---|---|---|
| JP | 01265209 A | * | 10/1989 | ............. G02B/6/28 |
| JP | 01293308 A | * | 11/1989 | ............. G02B/6/36 |

* cited by examiner

*Primary Examiner*—John D. Lee
*Assistant Examiner*—Daniel Valencia
(74) *Attorney, Agent, or Firm*—Jenner & Block, LLC

(57) ABSTRACT

A device for injecting light from one of a first group of optical fibers into a corresponding one of a second group of optical fibers includes a holder for locating each of the fibers in the first and second groups, a clamp for securing fibers in the second group to the holder, and a depressor for laterally displacing each of the fibers in the second group, thus forming a bend in each of the fibers in the second group. The maximum curvature in the bend occurs where the fibers in the second group exit the clamp. Light is injected from fibers in the first group into corresponding fibers in the second group at the point of maximum curvature. An optical gel may be used to used to promote optical coupling between fibers in the first group and fibers in the second group. The optical fibers in the second group may include a lens for focusing the light to be injected. The device can function in reverse to extract light from fibers in the second group into fibers in the first group.

15 Claims, 1 Drawing Sheet

LIGHT INJECTOR/EXTRACTOR FOR MULTIPLE OPTICAL FIBERS

BACKGROUND OF THE INVENTION

1. The Technical Field

The present invention is directed generally to the field of fiber optics. More particularly, the present invention is directed to a bend-type light injector/extractor for use with multiple optical fibers.

2. The Prior Art

Commercially available single mode-optical fiber couplers typically are made by twisting two uncoated optical fibers together, heating the twisted region, and pulling on the fiber ends to reduce the diameter of the heated and softened region. When the fiber diameters are reduced sufficiently, the fibers' core modes overlap to produce the desired optical coupling. In principle, this method could be applied to couple to an active fiber without interrupting data transmission through the active fiber, but the procedure would be very risky and would require complex, specialized equipment and precise control over the drawing process. Also, the finished coupler would be permanent and non-adjustable. Further, due to physical constraints, such a fabrication process probably would not be not well suited for use with fiber ribbons having multiple fibers.

Another method for coupling to an active fiber in a non-interrupting manner involves forming a macrobend, typically a constant-radius curve, in a fiber and injecting light through the bend into the core of the fiber. The light injector can consist of a cleaved single mode fiber plus a suitable lens. Injection efficiency (the fraction of the light leaving the injector which actually couples into the core mode of the subject fiber) using the macrobend approach tends to be very low due to inherently poor coupling. In addition, the macrobend techniques usually are applied only to conventional polymer-coated fiber because of the reliability concerns associated with bare fiber. When injecting through the polymer coating, aligning the injector with the single mode core of the bent fiber is extremely difficult, and the resulting coupling is very inefficient.

The basic macrobend technique also can be used to extract light from an optical fiber. For example, some commercial "fiber identifiers" used by fiber system installers utilize the macrobend technique for extracting light to identify active fibers and light propagation direction. Some commercially available macrobend-type couplers are available for use in connection with multiple-fiber ribbons.

The macrobend approach typically is not used for permanent couplers because of inherent inefficiencies, plus reliability concerns related to the fiber bending stresses. Bend-type couplers tend to subject the fiber to high bending stresses which are detrimental to the reliability of the fiber because of a phenomenon known as static fatigue. Static fatigue can cause a fiber in bending or tension to fail over time due to the propagation of cracks. The higher the initial stress a fiber is subjected to, the shorter its life is likely to be. Although it is known to use heat to anneal the bent fiber to remove the stress, this technique results in a permanent bend and, therefore, a coupler that is always "on" and not adjustable. Also, elaborate equipment and precise control are required to practice this technique.

SUMMARY OF THE INVENTION

The present invention provides for use in multiple-fiber applications an adjustable fiber optic coupler that allows efficient light injection into one or more active fibers to increase the capacity of a fiber optic system without disrupting existing traffic through the fiber. The present invention thus provides an apparatus for using, for example, multiple single mode injector fibers to simultaneously insert optical signals through the side of and into, for example, the single mode cores of corresponding traffic fibers as an alternative to the conventional approach of severing the traffic fibers to splice in pre-made couplers. For example, the present invention makes possible the insertion of additional wavelengths into multiple fibers (e.g., fiber ribbon) carrying WDM (wavelength division multiplexed) signals, without disrupting the existing traffic. The present invention thereby allows the transmission capacity of active fibers or a network to be upgraded without shutting the underlying system down, and without requiring alternate or "protect" fibers to temporarily carry the traffic over such a network.

The present invention is based on an implementation of what is referred to as the "transition effect." The transition effect occurs in an optical fiber at a location of curvature discontinuity, such as the point of transition from substantially straight fiber to curved fiber. The transition loss, which occurs for light propagating in either direction, is defined as the amount of light extracted from the fiber (the "loss") at the curvature discontinuity, or transition point. However, additional pure bending, or macrobend, losses of the signal on the affected traffic fiber (manifested in discrete rays of light) will occur if the curve is tight enough and/or long enough. The overall insertion loss includes the sum of the transition loss and the pure bending losses.

A light injector according to a preferred embodiment of the present invention includes a plurality of traffic fibers, a corresponding plurality of injector fibers, a substrate which holds corresponding traffic and injector fibers in proper alignment with each other, a clamp which secures the traffic fibers to the substrate, and a depressor which imparts a bend to a portion of each of the traffic fibers. Each injector fiber preferably includes a lens for directing light to be injected to the traffic fiber, this lens being connected to the fiber via an intervening coreless fiber spacer. Preferably, the depressor is adjustable. That is, it can be moved towards or away from the clamp so as to change the magnitude of the bend it imparts to the traffic fibers.

A multi-fiber injector according to the present invention is adjustable, highly-efficient, non-invasive, imposes small insertion loss, and can handle high data rates, as well as WDM signals. In addition, such a device is reciprocal in nature. That is, it can be used in reverse as a light extractor to extract, or drop, an adjustable fraction of light from multiple traffic fiber cores into corresponding detectors or other single mode fibers.

DETAILED DESCRIPTION OF THE DRAWINGS

The present invention applies the principles of the invention disclosed in copending, commonly assigned U.S. patent application Ser. No. 09/997,879 entitled "Bend-Type Fiber Optic Light Injector," filed on Nov. 30, 2001. The disclosure of the foregoing application is incorporated by reference herein in its entirety.

Figure 1:
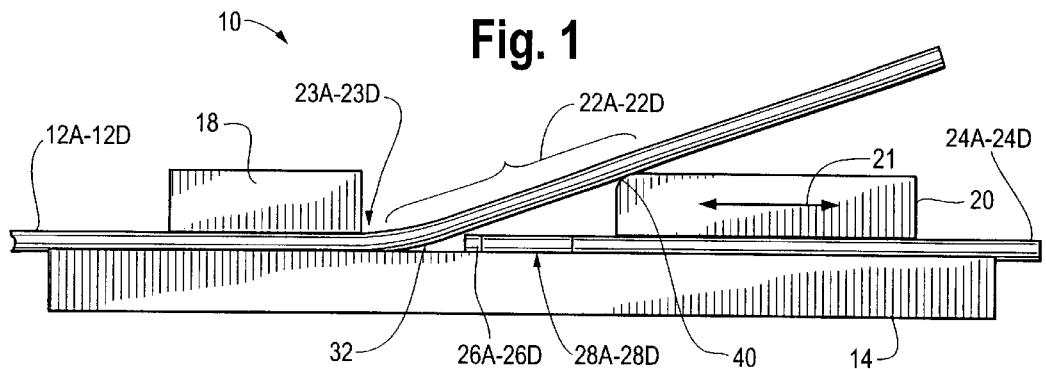
FIG. 1 is a side elevation view of an embodiment of a light injector according to the present invention.
Figure 2:
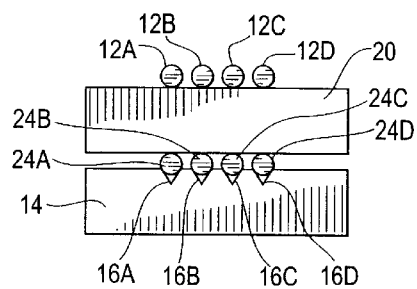
FIG. 2 is an end elevation view of the light injector illustrated in FIG. 1.

FIGS. 1 and 2 illustrate side and end views, respectively, of a multiple fiber light injector 10 according to a preferred embodiment of the present invention. In this embodiment, injector fibers 24A–24D, including corresponding lenses 26A–26D and intervening spacers 28A–28D, are located in a portion of grooves 16A–16D, respectively, of a holder 14. Clamp 18 holds a portion of traffic-carrying optical fibers 12A–12D securely in another portion of grooves 16A–16D of holder 14. A depressor 20 laterally deflects traffic fibers 12A–12D so as to induce a bend 22A–22D in each of traffic fibers 12A–12D between the point where traffic fibers 12A–12D exit clamp 18 and the point where they contact depressor 20. Preferably, depressor 20 is movable parallel to the longitudinal axes of traffic fibers 12A–12D, towards and away from clamp 18, as indicated by arrow 21.

The portion of each of traffic fibers 12A–12D between the clamp exit and the point of contact with depressor 20 possesses the bending characteristics of a cantilever beam. As is characteristic of a cantilever beam, the maximum curvature, or minimum bend radius, imparted to traffic fibers 12A–12D exists at the point 23A–23D where the traffic fibers exit clamp 18. This point of maximum curvature is referred to as the "transition point." The curvature of each of traffic fibers 12A–12D decreases as the distance from clamp 18 increases, until the curvature diminishes to zero at the point of contact with depressor 20. Also, there is zero curvature in the portion of traffic fibers 12A–12D located under clamp 18.

The degree of curvature at transition point 23A–23D per unit of lateral deflection imparted to corresponding traffic fiber 12A–12D by depressor 20 is a function of the cantilever length, i.e., the length of traffic fibers 12A–12D from the exit of clamp 18 to the point of contact with depressor 20. As the cantilever length increases, the degree of curvature per unit of lateral deflection decreases.

As noted in the referenced patent application, making the fiber cantilever as short as practical (about 800 microns for a typical 125 micron fiber) helps to ensure that only the transition effect is stimulated, and that no pure bending effects are generated. This generally results in the highest efficiency in both the injection and extraction modes. However, in the multi-fiber injector of the present invention, the preferred approach is to use a somewhat longer than ideal cantilever length, thereby somewhat compromising injection efficiency, in order to capitalize on the benefits of the v-grooves 16A–16D in holder 14 and of placing depressor 20 outboard of injector lens 26A–26D, as discussed further below.

As indicated above, depressor 20 preferably is axially movable with respect to the clamped portion of traffic fibers 12A–12D. By moving depressor 20 towards and away from clamp 18, one can adjust the cantilever length of traffic fibers 12A–12D and, therefore, the degree of curvature at transition point 23A–23D. Because the transition loss is a function of this maximum curvature, the foregoing axial movement of depressor 20 effectively adjusts the insertion loss for the corresponding traffic fiber 12A–12D. By placing depressor 20 outboard of injector fibers 24A–24D, depressor 20 can be adjusted without occluding the light beam between traffic fibers 12A–12D and lenses 26A–26D. This approach results in a nominal cantilever length of about 20–25 fiber diameters, which is somewhat longer than the ideal, but which is deemed to produce satisfactory results.

Optical fibers typically have a relatively soft polymer coating protecting the fiber cladding from damage that could lead to crack initiation and eventual fiber failure. It is difficult to achieve and maintain the required curvature discontinuity at the transition point if the soft polymer coating is left on, because the rigid glass fiber tends to "creep" within the relatively soft coating. This tendency to creep can cause the discontinuity to "flatten out," thus compromising the desired transition effect. This potential problem can be mitigated by removing the polymer coating from the portion of traffic fibers 12A–12D including the area underneath clamp 18 through and including the point where traffic fibers 12A–12D contact depressor 20. With traffic fibers 12A–12D so prepared, clamp 18 and depressor act directly on the traffic fibers' glass cladding. In a preferred embodiment of the invention, a thin, rigid coating (not shown) having substantially the same index of refraction as the traffic fibers' cladding is applied to the cladding after the soft coating has been removed. Preferably, this coating is a "sol-gel," as would be known to one skilled in the art. A thin layer of sol-gel recoat material has been found to provide better protection against stress corrosion than some original polymer coatings. The coating thickness need be no more than a few microns, and possibly less than one micron. In these embodiments, clamp 18 and depressor 20 act on the bare fiber or on the thin, rigid coating (not shown), respectively. A device wherein clamp 18 and depressor 20 act directly on the fiber cladding or on a thin rigid coating applied to the cladding can be expected to yield more stable performance than a device using fibers retaining the relatively soft coating within the device.

Each of traffic fibers 12A–12D and injector fibers 24A–24D preferably is 125 micron diameter single mode optical fiber, although other fiber diameters and types can be used in alternate embodiments. Each lens 26A–26D preferably is made of a segment of gradient index fiber of the correct length, fusion-spliced to a segment of coreless fiber 28A–28D, which in turn is fusion spliced to injector fiber 24A–24D. Alternatively, the lens, spacer and injection fiber can be coupled by means of mechanical butt splices, utilizing v-grooves 16A–16D in holder 14 to provide the required alignments. In a variation of this embodiment, coreless spacers 28A–28D can be replaced by an index matching gel or similar material. Lenses 26A–26D and spacers 28A–28D preferably are of the same diameter as injector fibers 24A–24D. The coreless spacers locate the respective lenses at a distance from the respective injector fibers substantially equal to the object distance for which the lens is designed.

The parabolic index profile of lens 26A–26D can extend out to the full lens diameter. The lens need not have a silica cladding on the outside, because the lens preferably is immersed in an index matching medium 32, as will be discussed further below. Utilizing the full diameter for lens 26A–26D maximizes the light gathering capability when the device is used in the extraction mode. For example, with a diameter of 125 microns in the preferred embodiment, lens 26A–26D can be placed close enough to transition point 23A–23D to intercept most of the transition output beam, which has a typical divergence of only 2–3°.

Injection efficiency is improved when the injector fiber core is in proper alignment with the traffic fiber core. In a preferred embodiment, the proper alignment is provided by holder 14. Preferably, holder 14 is a conventional silicon v-groove substrate. Alternatively, grooves 16A–16D can be precision formed using the deep reactive ion etching (DRIE) process. In another alternate embodiment, holder 14 and grooves 16A–16D can be precision molded from plastic or another suitable material. Holder 14 can be made from other materials and using other techniques, as well.

In the preferred embodiment illustrated in FIG. 1, both traffic fibers 12A–12D and corresponding injector fibers 24A–24D (including corresponding lenses 26A–26D and spacers 28A–28D) lie in the same v-grooves 16A–16D of holder 14. Placement of both traffic fibers 12A–12D and corresponding injector fibers 24A–24D into the same v-grooves ensures that corresponding fiber pairs are co-axial and that each lens 26A–26D is properly focused on transition point 23A–23D of corresponding traffic fiber 12A–12D. This alignment is facilitated when injector fibers 24A–24D and traffic fibers 12A–12D are of substantially the same diameter. Although this method of alignment is preferred, other alignment approaches may be used in alternate embodiments.

As illustrated in FIG. 1, an index matching medium 32 preferably is utilized in the space where the light beam propagates between traffic fibers 12A–12D and the corresponding injector fiber lens 26A–26D. Index matching medium 32, preferably a non-migrating optical gel, a hybrid sol-gel, or similar coupling medium, as would be known to one skilled in the art, has an index of refraction substantially the same as the index of the fiber cladding, which typically is fused silica. With a perfect index match between the traffic fiber 12A–12D cladding and index matching medium 32, the injected or extracted light beam is not refracted at the curved surface of the traffic fiber cladding, and reflection at the lens face is minimized. Index matching material 32 also provides important physical protection for the bent portion of traffic fiber 12A–12D from which the polymer coating has been removed.

Figure 3:
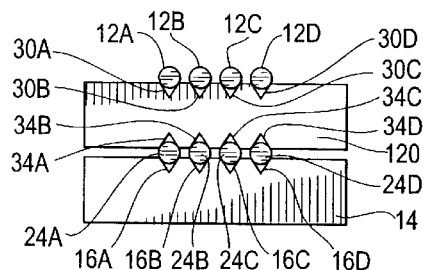
FIG. 3 is an end elevation view of a second embodiment of a light injector according to the present invention.

In the embodiment illustrated in FIGS. 1 and 2, depressor 20 is a simple block having substantially flat top and bottom surfaces. The upper corner 40 of depressor 20 which contacts and deflects traffic fibers 12A–12D preferably is radiused or chamfered to reduce the stress placed on the traffic fibers due to the deflection. In another preferred embodiment of the invention illustrated in FIG. 3, the top surface of depressor 120 includes grooves 30A–30D, and its bottom surface includes grooves 34A–34D. Each of grooves 30A–30D can be used to position a corresponding traffic fiber 12A–12D. Similarly, each of grooves 34A–34D can receive a corresponding injector fiber 24A–24D. This arrangement provides extremely precise alignment of the traffic and injector fibers.

Figure 4:
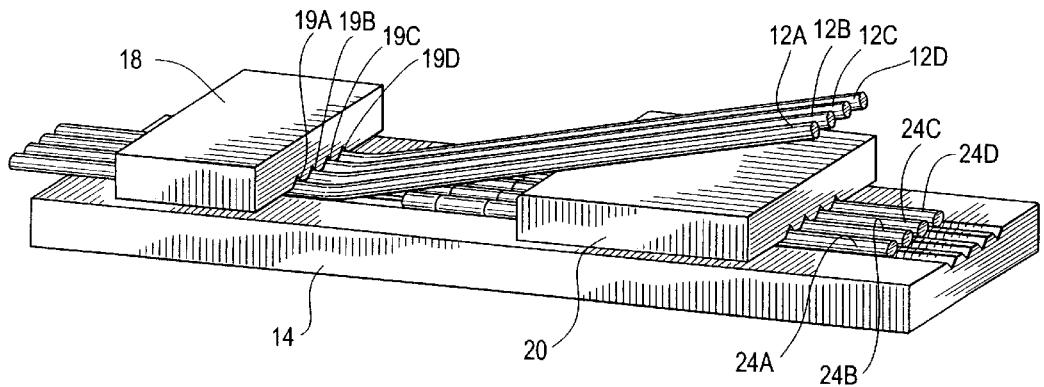
FIG. 4 is a perspective view of a preferred embodiment of a light injector according to the present invention.

Clamp 18 can be embodied as a simple block having a substantially flat bottom surface. However, the bottom surface of clamp 18 preferably includes grooves 19A–19D, as illustrated in FIG. 4. Grooves 19A–19D help to align clamp 18 with traffic fibers 12A–12D. The embodiments of clamp 18 and depressor 20 including grooves, as described above, preferably are silicon v-groove substrates. Alternatively, they can be fabricated from another suitable material, as discussed above with respect to holder 14.

In use, an amount of light can be injected from any or all of injector fibers 24A–24D into corresponding traffic fibers 12A–12D by adjusting depressor 20 to impart a sufficient curvature to the traffic fibers and directing light from the injector fibers toward the transition points 23A–23D thus formed. The amount of light injected to traffic fibers 12A–12D can be decreased by adjusting depressor 20 away from clamp 18, thus decreasing the curvature of the traffic fibers at the transition point, thus decreasing the transition loss therethrough. Conversely, the amount of light injected to traffic fibers 12A–12D can be increased by adjusting depressor 20 toward clamp 18, thus increasing the curvature of the traffic fibers at the transition point, thus increasing the transition loss therethrough.

While the present invention has been described as a device for increasing optical fiber transmission capacity by injecting light into an active fiber without interrupting existing traffic, the reciprocal behavior of the device also allows it to be used as an efficient light extractor. All of the advantageous features of the injector apply equally to the extractor. In fact, computer modeling predicts that, for 125 micron single mode fiber in the extraction mode, up to 65% of the light leaving the core at the transition can be coupled into the core of a suitably lensed single mode pickup fiber. Further, some fibers of a particular device according to the present invention can be used in an extractor mode, while other fibers simultaneously are used in an injector mode.

The foregoing description is merely illustrative of certain preferred embodiments of the present invention. Those skilled in the art will recognize that modifications and variations thereto can be implemented without departing from the spirit of the invention, the scope of which is limited only by the claims appended hereto.

We claim:

1. An apparatus for exchanging light energy between ones of a first plurality of optical fibers and corresponding ones of a second plurality of optical fibers, comprising:

a substrate holding at least a first portion of each of said first plurality of optical fibers and at least a portion of each of said second plurality of optical fibers in a predetermined orientation;

a clamp securing said first portion of each of said first plurality of optical fibers to said substrate; and a depressor operably associated with a second portion of each of said first plurality of optical fibers, said depressor configured so as to selectively effect a bend into a third portion of each of said first plurality of optical fibers, said bend having a region of discontinuous curvature;

wherein light energy from said second plurality of optical fibers is focused at said region of discontinuous curvature.

2. The apparatus of claim 1 wherein said substrate comprises a plurality of grooves, wherein each of said grooves receives said first portion of a corresponding one of said first plurality of optical fibers.

3. The apparatus of claim 2 wherein each of said plurality of grooves further receives said at least a portion of one of said second plurality of optical fibers corresponding to one of said first plurality of optical fibers.

4. The apparatus of claim 1 wherein said depressor comprises a first plurality of grooves, wherein each of said first plurality of grooves receives said at least a said second portion of a corresponding one of said first plurality of optical fibers.

5. The apparatus of claim 4 wherein said depressor further comprises a second plurality of grooves, wherein each of said second plurality of grooves receives said at least a portion of a corresponding one of said second plurality of optical fibers.

6. The apparatus of claim 1 wherein said depressor includes a first plurality of grooves, wherein each of said first plurality of grooves receives said at least a portion of a corresponding one of said second plurality of optical fibers.

7. The apparatus of claim 6 wherein said depressor further comprises a second plurality of grooves, wherein each of said second plurality of grooves receives said at least said second portion of a corresponding one of said first plurality of optical fibers.

8. The apparatus of claim 1 wherein each of said second plurality of optical fibers further comprises a lens.

9. The apparatus of claim 8 wherein said lens comprises a section of gradient index fiber.

10. The apparatus of claim 8 wherein each of said second plurality of optical fibers further comprises a spacer positioned between said lens and the corresponding one of said second plurality of optical fibers.

11. The apparatus of claim 10 wherein said spacer comprises an index matching material.

12. The apparatus of claim 10 wherein said spacer comprises a segment of coreless fiber.

13. The apparatus of claim 1 further comprising an index-matching medium, wherein said index-matching medium optically couples each of said first plurality of optical fibers with a corresponding one of said second plurality of optical fibers.

14. An apparatus for exchanging light energy between a first plurality of optical fibers and a second plurality of optical fibers, comprising: means for locating at least a first portion of said first plurality of optical fibers on a substrate in a predetermined orientation; means for securing said first portion of said first plurality of optical fibers to said substrate; means associated with a second portion of said first plurality of optical fibers for selectively effecting a bend having a region of discontinuous curvature into a third portion of each of said first plurality of optical fibers; and means for locating at least a portion of said second plurality of optical fibers on said substrate in a predetermined orientation enabling transfer of light energy between each of said second plurality of optical fibers and said region of discontinuous curvature of corresponding ones of said first plurality of optical fibers.

15. The apparatus of claim 14 wherein said first portion of said first plurality of optical fibers is directly adjacent said third portion of said first plurality of optical fibers.

* * * * *